(12) United States Patent
Young, Jr. et al.

(10) Patent No.: US 12,112,092 B2
(45) Date of Patent: Oct. 8, 2024

(54) SYSTEM AND METHOD FOR MEETING VOLUME OPTIMIZER

(71) Applicant: Capital One Services, LLC, McLean, VA (US)

(72) Inventors: Michael Anthony Young, Jr., Henrico, VA (US); Christopher Mcdaniel, Glen Allen, VA (US); Matthew Louis Nowak, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 256 days.

(21) Appl. No.: 17/588,595

(22) Filed: Jan. 31, 2022

(65) Prior Publication Data

US 2023/0244438 A1    Aug. 3, 2023

(51) Int. Cl.
*G06F 3/16* (2006.01)
*G06F 40/20* (2020.01)
*G06Q 10/1093* (2023.01)
*G06N 20/00* (2019.01)

(52) U.S. Cl.
CPC .............. *G06F 3/165* (2013.01); *G06F 40/20* (2020.01); *G06Q 10/1095* (2013.01); *G06N 20/00* (2019.01)

(58) Field of Classification Search
CPC ............................. G06F 3/0482; G06F 16/635
USPC ......................................................... 700/94
See application file for complete search history.

(56) References Cited

U.S. PATENT DOCUMENTS

| | | | |
|---|---|---|---|
| 10,360,304 B1* | 7/2019 | Alvarez | G05B 15/02 |
| 10,735,211 B2 | 8/2020 | Vogel et al. | |
| 2016/0239782 A1* | 8/2016 | Khatravath | G06Q 10/1091 |
| 2017/0147950 A1 | 5/2017 | Carbonell et al. | |
| 2018/0046957 A1 | 2/2018 | Yaari et al. | |
| 2018/0089633 A1* | 3/2018 | Johnson | G06Q 40/12 |
| 2020/0219066 A1 | 7/2020 | Lin et al. | |
| 2020/0234251 A1 | 7/2020 | Ma et al. | |
| 2020/0341882 A1* | 10/2020 | Entrekin | G06F 11/3438 |
| 2021/0287182 A1* | 9/2021 | White | G06Q 10/10 |
| 2022/0066800 A1* | 3/2022 | Singh | G06F 9/453 |
| 2022/0261735 A1* | 8/2022 | Kotzen | G06Q 10/063118 |
| 2023/0244438 A1* | 8/2023 | Young, Jr. | G06N 5/01 |
| | | | 700/94 |

* cited by examiner

*Primary Examiner* — Alexander Krzystan
(74) *Attorney, Agent, or Firm* — Sterne, Kessler, Goldstein & Fox P.L.L.C.

(57) ABSTRACT

Disclosed herein are system, method, and computer program product embodiments for machine learning systems to predict real-time productivity changes based on prospective scheduling. A productivity predictive model is trained by a machine learning engine with meeting and productivity training data, wherein the productivity predictive model includes one or more algorithms to select a future productivity change based on a future schedule. The system receives a current schedule and current productivity measurements of a user, receives a scheduling request for the user, predicts a future productivity change and displays a graphic to a user revealing the future productivity change of the user based on accepting the scheduling request.

20 Claims, 7 Drawing Sheets

SCHEDULE

October

| M 12 | T 13 | W 14 | TH 15 | F 16 |
|---|---|---|---|---|
| 10:30 Meeting 1 | | | 10:00 Meeting 2 | |
| | | | 10:30-11:30 Meeting Request | |

506

500

NEW SCHEDULING REQUEST

THURSDAY OCTOBER 15TH 10:30-11:30 AM

IF ACCEPTED, THIS MEETING MAY CHANGE YOUR PRODUCTIVITY

-8%

ACCEPT? ☐ YES ☐ NO

RESCHEDULE? ☐ YES

SCHEDULE

600

October

| M | T | W | TH | F |
|---|---|---|---|---|
| 12 | 13 | 14 | 15 | 16 |
| 10:30 Meeting 1 | | | 10:00 Meeting 2 | |
| | | | 10:30-11:30 Meeting Request | |

604

October

| M | T | W | TH | F |
|---|---|---|---|---|
| 19 | 20 | 21 | 22 | 23 |
| | 10:30-11:30 Resch. Meeting Request | | 11:00 Meeting 3 | |

606

602

RESCHEDULING PROPOSAL

MONDAY OCTOBER 20TH 10:30-11:30 AM

IF ACCEPTED, THIS MEETING MAY CHANGE YOUR PRODUCTIVITY

+7%

ACCEPT? ☐ YES ☐ NO

RESCHEDULE? ☐ YES ☐ NO

SELECT A NEW RESCHEDULE TIME

SYSTEM AND METHOD FOR MEETING VOLUME OPTIMIZER

BACKGROUND

Computers may be used to automate scheduling of meetings. However, missing in current computer-based scheduling systems is an ability to properly recognize changes to user productivity. What is needed is a technical solution to derive productivity changes as they pertain to scheduling.

BRIEF DESCRIPTION OF THE DRAWINGS

The accompanying drawings are incorporated herein and form a part of the specification.

FIG. 5 is an example graphical user interface for displaying productivity changes, according to some embodiments.

FIG. 6 is another example graphical user interface for displaying productivity changes, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof to predict real-time productivity changes based on prospective scheduling.

In some embodiments, the technology described herein processes incoming scheduling requests based on inferred (machine learning model) productivity changes. For example, a user receives a request for a new meeting. The system will predict, based on a trained predictive model, changes in productivity if the user were to accept the request. Alternatively, or in addition, the system will predict, based on the trained predictive model, changes in productivity if the user selects rescheduling of the requested meeting.

Figure 1:
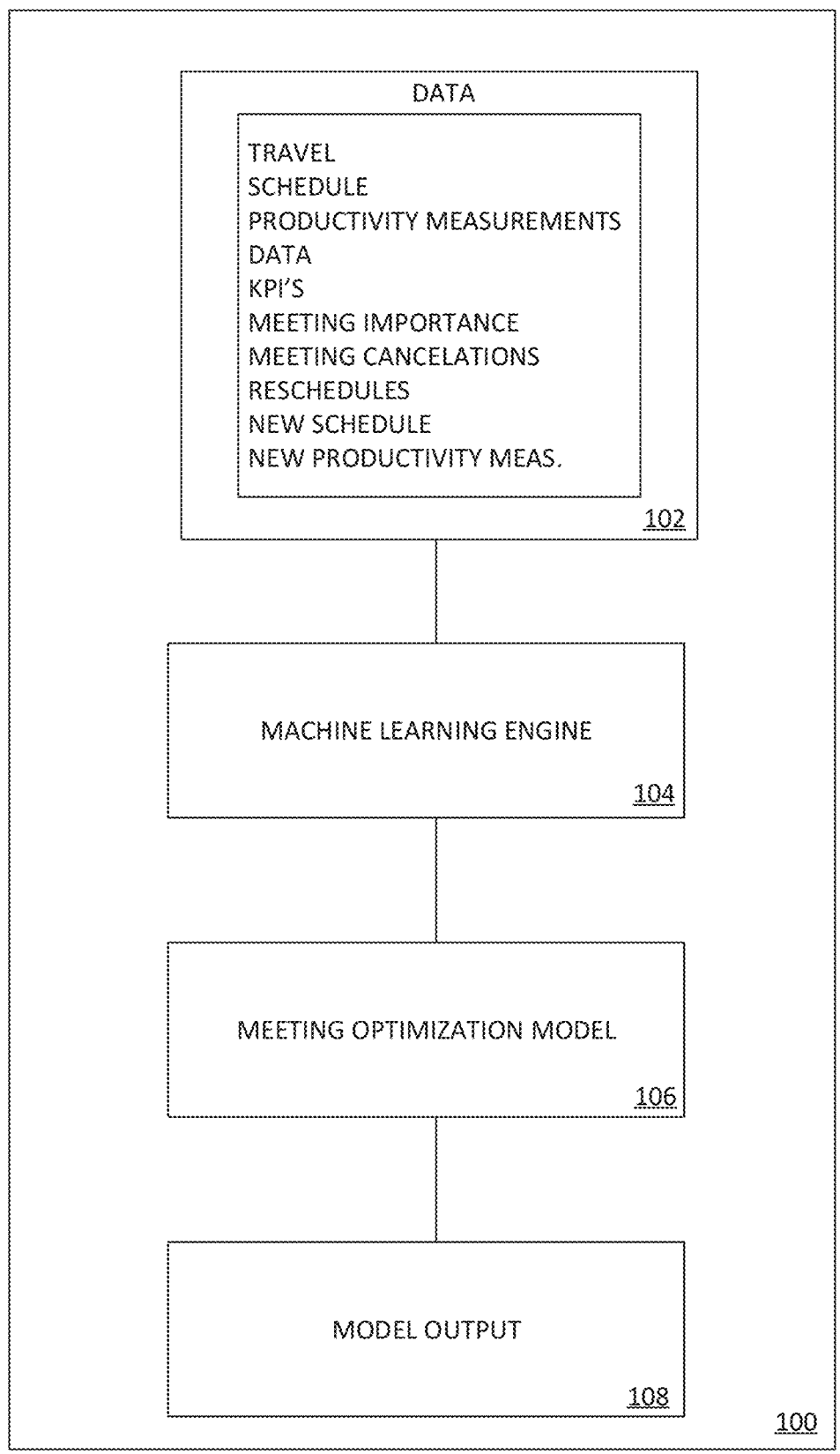
FIG. 1 is a block diagram of a system for processing scheduling and productivity data with machine learning, according to some embodiments.

FIG. 1 illustrates a block diagram of a machine learning system, according to some embodiments. System 100 may be implemented by hardware (e.g., switching logic, communications hardware, communications circuitry, computer processing devices, microprocessors, dedicated logic, programmable logic, microcode, etc.), software (e.g., instructions executing on a processing device), or a combination thereof. It is to be appreciated that not all components may be needed to perform the disclosure provided herein. Further, some of the processes described may be performed simultaneously, or in a different order or arrangement than shown in FIG. 1, as will be understood by a person of ordinary skill in the art.

System 100 shall be described with reference to FIG. 1. However, system 100 is not limited to this example embodiment. In addition, system 100 will be described at a high level to provide an overall understanding of one example flow from meeting request to an output reflecting a change in productivity. Greater detail will be provided in the figures that follow.

Scheduling is an action of assigning resources to perform tasks. In some embodiments described herein, the resources may be time available by company personnel (i.e., employees) and the tasks may be work product related tasks assigned to those employees. For example, a company employee may want to schedule meetings for a time period. However, conflicts may arise with current tasks and currently scheduled meetings. Understanding how scheduling or accepting a request from another for a new meeting will affect the user's productivity may be difficult to discern by simply looking at a calendar of scheduled meetings/tasks.

Productivity is the efficiency of production of services expressed by some measure. Measurements of productivity are often expressed as a ratio of an aggregate output to a single input or an aggregate input used in a production process, i.e. output per unit of input, typically over a specific period of time. The most common example is an aggregate labor productivity measure, for example, such as production per worker.

Productivity is a crucial factor in the production performance of companies. In general, labor productivity is equal to the ratio between a measure of output volume (e.g., work tasks completed) and a measure of input use (e.g., the total number of hours worked). The output measure is typically net output (i.e., the value of outputs minus the value of intermediate inputs).

In the various embodiments described herein, productivity determinations need not be limited to a single employee, but rather productivity calculations may reflect how the requested meeting may affect a group of employees (e.g., office, department or a division, etc.) In this case, labor input may be measured either by the total number of hours worked of all persons employed, total employment (head count) or total number of work hours assigned to a specific project or task.

Productivity, in some embodiments, may also be calculated based on multiple factors. In a non-limiting example, productivity may be partially calculated based on a task or an aggregate of tasks (e.g., employees and employee hours assigned to a project, etc.). Alternatively, or in addition, productivity may be partially calculated on based on location (e.g., employees located at a specific research facility or in a specific office, etc.) Alternatively, or in addition, productivity may be partially calculated based on ancillary items (e.g., travel time to a project, additional training required, wasted time between tasks, etc.). While specific productivity examples are provided throughout the descriptions, any known or future productivity metric may be substituted herein without departing from the scope of the technology disclosed. In addition, any known productivity platform (e.g., platform for tracking work planning and work products) may be substituted herein without departing from the scope of the technology disclosed.

System 100 may include a machine learning engine 104 of one or more servers (cloud or local) processing data inputs. The data inputs 102 may include, but not be limited to, audio/text, such as words, numerals, dates, times, phrases, sentences, or metadata, reflecting scheduling or productivity relationships. Non-limiting examples reflecting scheduling relationships may comprise a meeting request, data within a calendar, travel data, an existing schedule, meeting importance, meeting cancellations, reschedules, new schedules, etc. Non-limiting examples reflecting productivity relationships may comprise current productivity data, current productivity measurements (e.g., Key Productivity Indicators (KPIs)), new productivity data or new productivity measurements, etc. A performance indicator or key performance indicator (KPI) is a type of performance measurement. KPIs evaluate the success of an organization or of a particular activity (such as projects, programs, products and other initiatives) in which it engages. Often success is simply the repeated, periodic achievement of some levels of operational goal (e.g., zero defects, 10/10 customer satisfaction, etc.) or success may be defined in terms of making progress toward strategic goals. Accordingly, KPIs rely upon a good understanding of what is important to the organization. In addition, what is deemed important often depends on the department measuring the performance, for example, the KPIs useful to finance will differ from the KPIs assigned to sales.

In some embodiments, the data inputs are received and parsed by a Natural Language Processing (NLP) system to capture, recognize and understand the data as it relates to scheduling and productivity systems and processes. For example, the NLP may parse out numerical data (e.g., calendar data) related to times and dates. In another example, the NLP may extract a meaning of text by recognizing sematic relationships between words, phrases, and/or numerical data. In yet another example, the NLP may extract meaning of metadata associated with meeting requests or productivity. Outputs from the NLP may, in some embodiments, be fed to the machine learning engine 104 as training data or new data inputs. Natural language processing is well understood and therefore will not be described in detail herein. Any known or future NLP may be substituted without departing from the scope of the technology described herein.

As described in various embodiments, machine learning engine 104 is configured to train a meeting optimization model 106 with input data 102. The meeting optimization model 106 may predict productivity changes based on a prospective future schedule. For example, what change to productivity would occur if a specific meeting request is accepted or is alternatively rescheduled. A model output 108 of meeting optimization model 106 may, in some embodiments include a Graphical User Interface (GUI) illustrating a schedule request and a potential impact to current productivity. Other outputs may be user options to accept, decline or reschedule (see FIGS. 5-6). In addition, other outputs are contemplated within the scope of the technology described herein. In addition, the GUI may be presented (i.e., displayed) on fixed or mobile devices (e.g., computer workstation, laptop, smartphone, tablet, wearable devices, etc.) and be part of a display of information within an APP (application), as part of calendar or scheduling system, etc. While described in stages, the sequence may include more or less stages or be performed in a different order.

Figure 2:
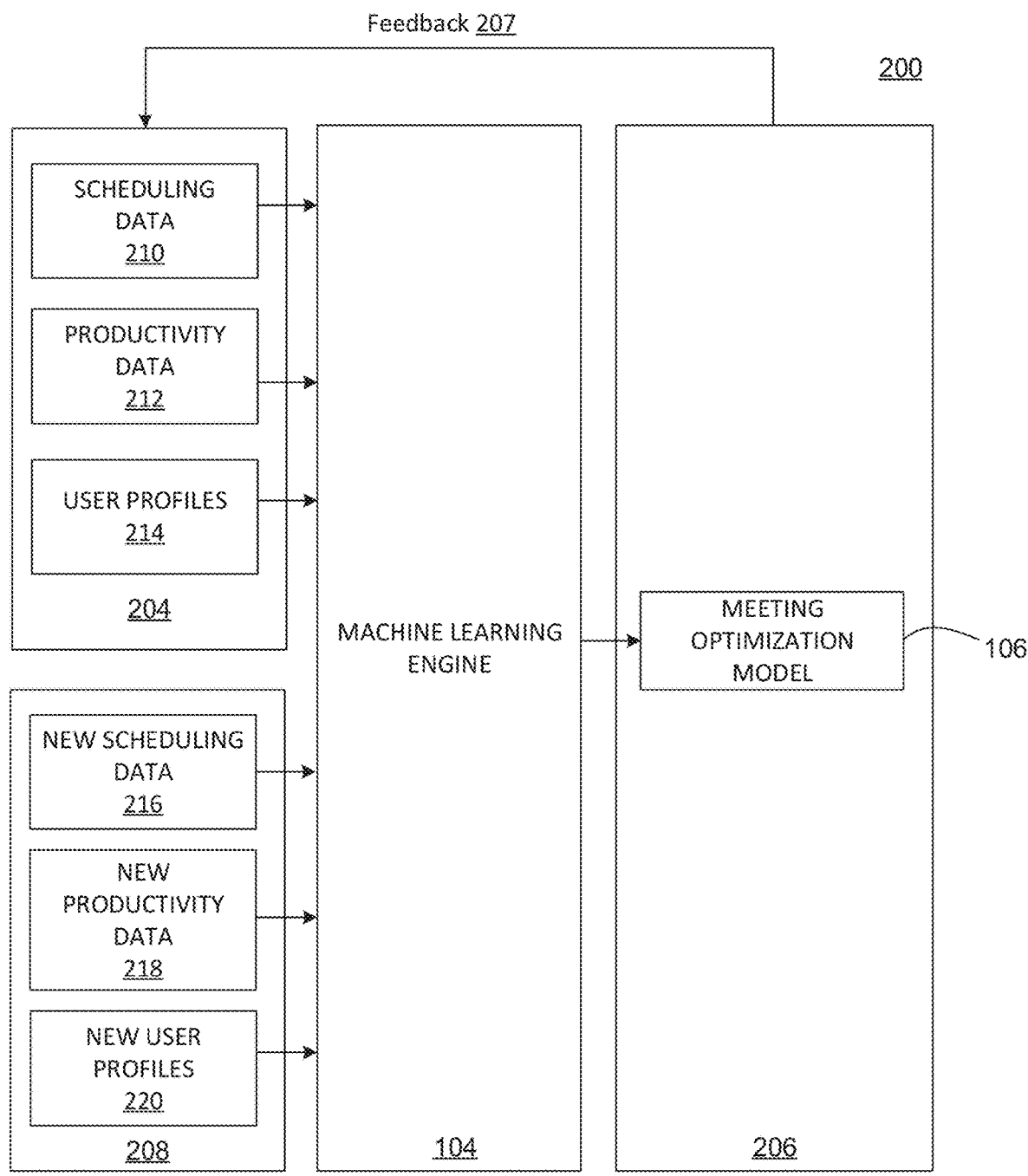
FIG. 2 is a block diagram for generating a meeting optimization predictive model with machine learning, according to some embodiments.

FIG. 2 illustrates a block diagram of a machine learning system, according to some embodiments. System 200 may be implemented by hardware (e.g., switching logic, communications hardware, communications circuitry, computer processing devices, microprocessors, dedicated logic, programmable logic, microcode, etc.), software (e.g., instructions executing on a processing device), or a combination thereof. It is to be appreciated that not all components may be needed to perform the disclosure provided herein. Further, some of the processes described may be performed simultaneously, or in a different order or arrangement than shown in FIG. 1, as will be understood by a person of ordinary skill in the art. In some embodiments, the technology described herein may use historical scheduling and productivity data to train a machine learning model (meeting optimization model 106) to automatically calculate a prospective change in productivity based on accepting an incoming meeting request.

System 200 shall be described with reference to FIG. 2. However, system 200 is not limited to this example embodiment. In addition, system 200 will be described at a high level to provide an overall understanding of one example flow from meeting request to an output reflecting a change in productivity. Greater detail will be provided in the figures that follow.

As described in various embodiments, machine learning engine 104 may be used to predict productivity changes based on a future schedule. While described in stages, the sequence may include more or less stages or be performed in a different order.

Machine learning system 200 may include a machine learning engine 104 of one or more servers (cloud or local) to train and fine tune a meeting optimization model 106. Meeting optimization model 106 is trained by training data 204, including, but not limited to, scheduling data 210, productivity data 212 and user profiles 214. User profiles may include a user's position within a company (suggesting relative importance), assigned projects, typical travel arrangements, training levels, learned productivity levels (suggesting learned ability based on performance from previous busy workloads), importance to specific workloads/projects, user schedule (shift, m-f 9-5 etc.), subject matter expertise, etc. As previously described, a NLP may parse the input data by processing words, numerals, phrases or sentences, to recognize context and/or semantics and classify relationships of words (e.g., within sentences).

Machine learning involves computers discovering how they can perform tasks without being explicitly programmed to do so. Machine learning (ML) includes, but is not limited to, artificial intelligence, deep learning, fuzzy learning, supervised learning, unsupervised learning, etc. Machine learning algorithms build a model based on sample data, known as "training data" 204, in order to make predictions or decisions without being explicitly programmed to do so. For supervised learning, the computer is presented with example inputs and their desired outputs and the goal is to learn a general rule that maps inputs to outputs. In another non-limiting example, for unsupervised learning, no labels are provided to the learning algorithm, leaving it on its own to find structure in its input. Unsupervised learning can be a goal in itself (discovering hidden patterns in data) or a means towards an end (feature learning).

Machine learning engine 202 may use various classifiers to map concepts associated with a specific language structure to capture relationships between concepts and words/numerals/phrases/sentences. The classifier (discriminator) is trained to distinguish (recognize) variations. Different variations may be classified to ensure no collapse of the classifier and so that variations can be distinguished.

Machine learning may, in some embodiments, involve computers learning from data provided so that they carry out certain tasks. For more advanced tasks, it can be challenging for a human to manually create the needed algorithms. This may be especially true of teaching approaches to correctly identify productivity changes within varying scheduling and productivity constructs. For example, a meeting scheduling system may vary from business unit-to-business unit or company-to-company. In another example, productivity standards, variables, calculation processes and allocation within a company may vary greatly. The discipline of machine learning therefore employs various approaches to teach computers to accomplish tasks where no fully satisfactory algorithm is available. In cases where vast numbers of potential answers exist, one approach, supervised learning, is to label some of the correct answers as valid. In an exemplary supervised embodiment, historical scheduling data is paired with associated productivity data and user profiles, where the machine learning engine may classify changes to productivity based on the various historical scheduling changes. For example, to train a system for the task of productivity change recognition, a dataset of word matches to specific work tasks and corresponding performance metrics may be used.

In a first stage, training data set 204 (in this case scheduling data 210, productivity data 212, user profiles 214, etc.) may be ingested by the machine learning engine 104 to train various predictive models 206. While described herein as a single meeting productivity optimization model 106, the model may be broken into smaller functional units. For example, a first model may predict employee hours needed if accepting a specific new meeting request (e.g., meeting time needed, prospective future time allocation based on a subject matter (e.g., task or project) of the meeting, travel time needed, training time needed, etc.) A second model may classify a user's current productivity levels. A third model may predict an importance of the meeting request relative to current meetings or currently assigned tasks. For example, the model may weight a scheduling request based on an inferred importance. For example, the model is trained to recognize and classify meeting importance based on user profile position data.

A fourth model may then predict changes to these productivity levels based on either accepting the requested meeting or alternatively, rescheduling the requested meeting.

In a first case example, meeting optimization model 106 may be trained based on machine learning engine 104 processing training data set 204. Training a model means learning (determining) values for weights as well as inherent bias from labeled examples. In supervised learning, a machine learning algorithm builds a model by examining many examples and attempting to find a model that minimizes loss; this process is called empirical risk minimization. In this case, meeting optimization model 106 is trained to recognize a user's current scheduling and productivity data and prospective future scheduling and productivity data to infer (predict) a change to productivity based on accepting or rescheduling a prospective meeting request.

In a second stage, the training cycle continuously looks at results, measures accuracy and fine-tunes the inputs to the modeling engine (feedback loop 207) to improve capabilities of the meeting optimization model 106.

In some embodiments, once the meeting optimization model is trained, a scheduling system may preemptively warn the user that their productivity may be negatively affected. In addition, the system may modify the productivity prediction based on recognizing trends in productivity scores (trend/feedback). In some embodiments, productivity change may be calculated as a percentage change or in time change (e.g., will lose 40 minutes on current projects or tasks). In some embodiments, productivity change may be framed as a binary classification task (e.g., increase/decrease in productivity). In some embodiments, the system may use predicted productivity scores over time to track company/department trends and to subsequently monitor actual changes to productivity to determine efficacy of the prediction.

In this specific example, the input sequence is the current scheduling data, current productivity data and customer profile and a response is a change to the current productivity based on a new meeting request. In a non-limiting example, a seq2seq model may be trained on several hundred thousand such problem statement/response pairs, culled from past interactions. The seq2seq may be used for any task that involves learning to produce a sequence of tokens given some input sequence of tokens. For example, a machine translation task where an input is French sentences and an output is English sentences. In another example, the training data may include question/answer pairs for conversational AI (e.g., input is question and output is answer).

In addition, as various predictive models (algorithms) 206 are created, they are stored in a database (not shown). For example, as the training sets are processed through the machine learning engine 104, the meeting optimization model 106 may change (tuning/fine tuning) and therefore may be recorded in the database. Future new data 208 (e.g., new scheduling data 216, new productivity data 218 or user profiles 220) may be subsequently evaluated with the trained predictive models 206.

Figure 3:
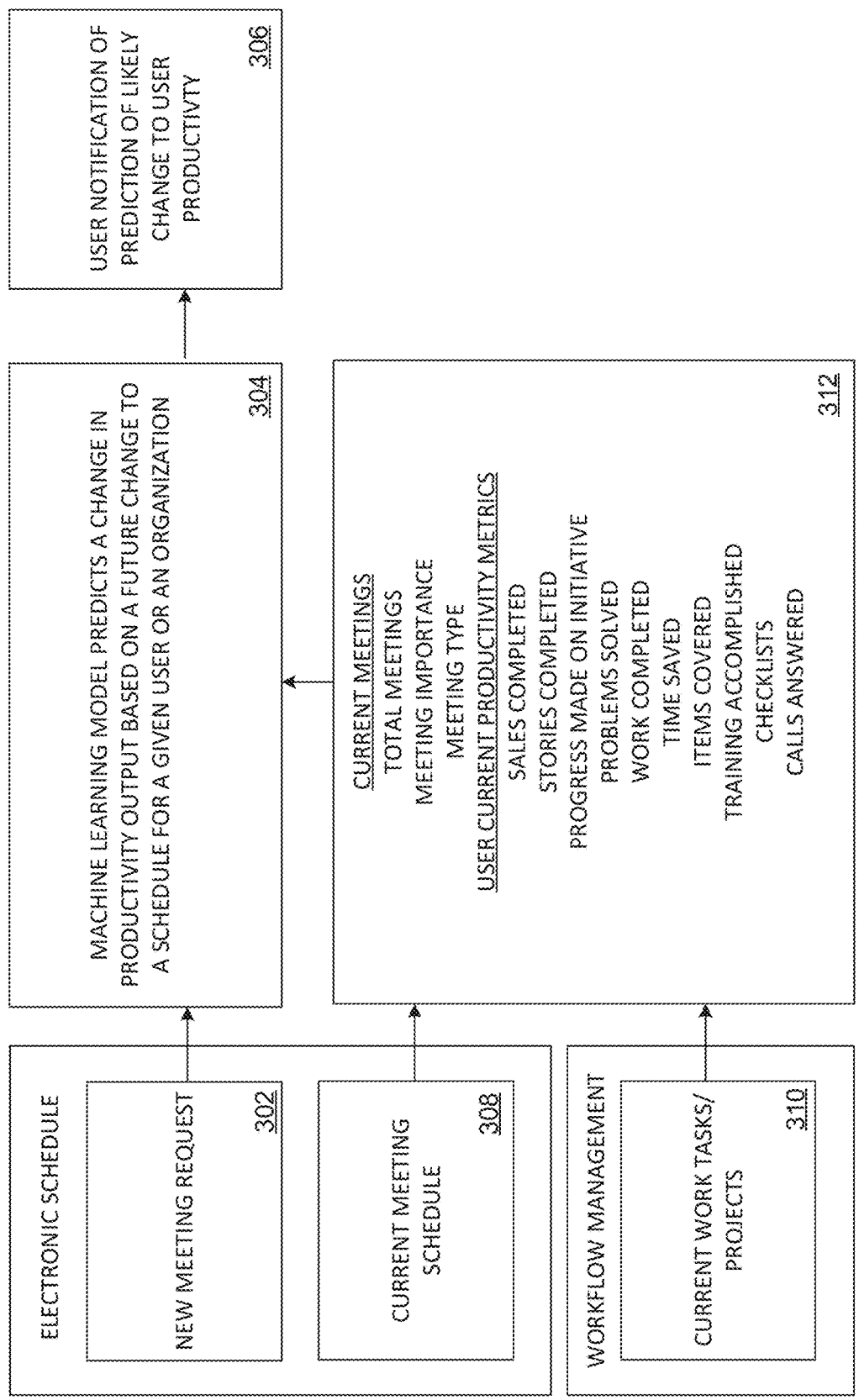
FIG. 3 is a block diagram for processing an incoming scheduling request with machine learning, according to some embodiments.

FIG. 3 is a flow diagram 300 for real-time meeting request processing, according to some embodiments. The functional blocks described may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the system 100 or 200 or installed as a removable portion of these systems. Also, alternative embodiments can perform functional blocks, steps, operations, methods, etc. using orderings different than those described herein.

In 304, a trained machine learning model (e.g., meeting optimization model 106) receives various inputs to predict a change in user productivity based on a future scheduling change. A first input includes a new meeting request 302. New meeting request 302 may include a proposed time, duration, subject matter and requestor profile data (e.g., name, company and position). The new meeting request may also include, but not be limited to, alternate proposed meeting times, other participants, project name, tasks, or attachments to consider. A second input includes current meetings (previously scheduled) and current productivity metrics 312. Current meeting data may include, but not be limited to, total meetings (i.e., count or number), meeting importance, meeting type (e.g., in-person, telephonic, online, on-site, off-site, etc.). Current meeting data may be derived from parsing (e.g., utilizing a NLP) of a current meeting schedule 308. User current productivity metrics may include, but not be limited to, sales completed, stories completed, progress made on an initiative, problems solved, work completed, time saved, items covered, training accomplished checklists or calls answered. Current productivity data may be derived from parsing (e.g., utilizing a NLP) of current work tasks/projects 310.

Prospective productivity changes, if a user accepts the meeting request or selects an alternate reschedule time, are output as a user notification of prediction of likely changes to user productivity 306. In some embodiments, a Graphical User Interface (GUI) renders a schedule request and a potential impact to current productivity. Other outputs may be user options to accept, decline or reschedule (see FIGS. 5-6). In addition, other outputs are contemplated within the scope of the technology described herein.

Figure 4:
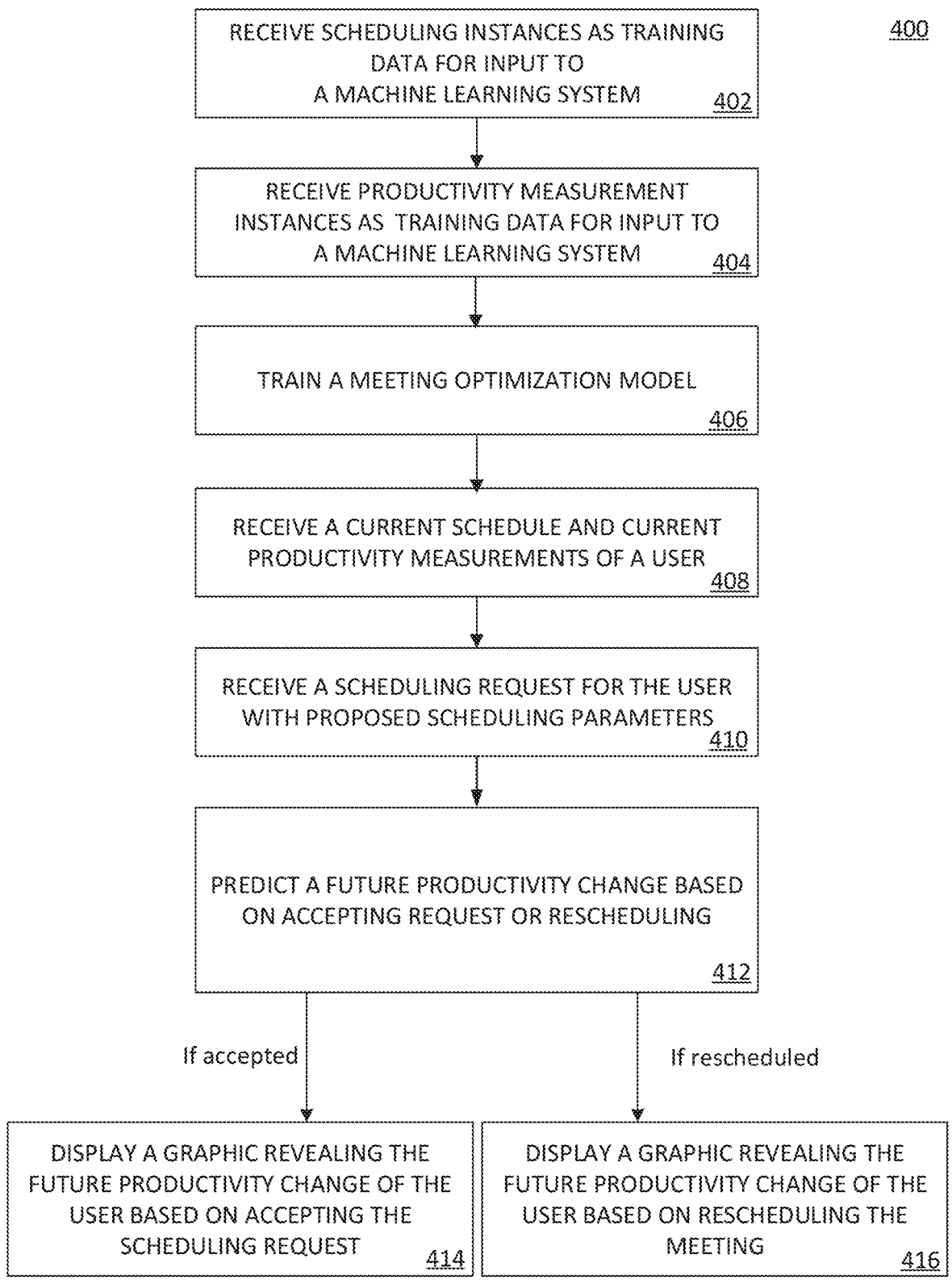
FIG. 4 is a flow diagram for processing an incoming scheduling request with machine learning, according to some embodiments.

FIG. 4 is a flow diagram 400 for real-time meeting request processing, according to some embodiments. The functional blocks described may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the system 100 or 200 or installed as a removable portion of these systems. Also, alternative embodiments can perform functional blocks, steps, operations, methods, etc. using orderings different than those described herein.

In 402, a machine learning system is configured to receive first training data as an input to the machine learning system, wherein the first training data includes multiple scheduling instances, and wherein the scheduling instances specify a plurality of scheduling parameters upon which to make a prediction of a future schedule.

In 404, the machine learning system is configured to receive second training data as an input to the machine learning system, wherein the second training data includes multiple productivity measurement instances, and wherein the productivity measurement instances specify a plurality of productivity parameters upon which to make a prediction of a future productivity.

In 406, the machine learning system trains a productivity predictive model with the first training data and the second training data, wherein the productivity predictive model includes one or more algorithms to select a future productivity change based on the future schedule. Alternatively, or in addition, a third training data set of user profile information may be input during the training process to reflect user information, such as, importance, department, location, assigned projects or tasks, training level, travel data, etc.

In 408, the productivity predictive model receives a current schedule and current productivity measurements of a user, a scheduling request 410 for the user, wherein the scheduling request includes one or more proposed scheduling parameters. Alternatively, or in addition, the current user profile information may be received as an input to the trained productivity predictive model.

In 412, a prediction is generated of a future productivity change, based on implementing the productivity predictive model with data inputs of the current schedule, the current productivity measurements of a user, the one or more proposed scheduling parameters and/or user profile, and a prospective user decision to accept the scheduling request or alternately a proposed rescheduling time.

In 414, a graphical user interface is configured to display a graphic revealing the future productivity change of the user based on accepting the scheduling request. In 416, a graphical user interface is configured to display a graphic revealing the future productivity change of the user based on accepting the proposed rescheduling time.

FIG. 5 illustrates an example graphical user interface for scheduling, as per some embodiments. The graphical user interface is directed to a specific improvement to the way computers operate because the graphical user interface imparts specific functionality directly related to the GUI's structure that resolves a prior art problem identified in the art. More specifically, the claims improve usability of the graphical user interface by updating in real time the graphical user interface to capture changes in productivity based on prospective scheduling of new meetings, thus improving the user experience.

As shown, graphical user interface (GUI) 500 illustrates schedule 502 with a single work week time span 506 rendered (for brevity) and a separate scheduling impact/options section 504. Within this week, a first meeting (meeting 1) and a second meeting (meeting 2) have been previously scheduled. A new meeting request for Thursday October 15th 10:30-11:30 AM is received and shown prospectively on the week's schedule. A determination for changes in productivity, based on a user accepting this meeting, reflects a first implementation instance (or more) of the meeting optimization model. This instance takes into account the user's current schedule and current productivity. Alternatively, or in addition, the meeting optimization model may weight this request based on user profile data, such as inferred importance. For example, the meeting optimization model is trained to recognize and classify meeting importance based on the user profile position data. In some embodiments, the meeting importance may affect productivity changes. For example, if a time sensitive requirement comes up, even though it might drop productivity overall for an individual or team in general. The specific productivity for the more important time sensitive requirement could take precedence, which in turn would lead to overall better results and a recommendation to take the meeting.

In this non-limiting example, the new meeting request, if accepted, would reduce the user's productivity 8%. While shown a percentage, the metric may be time lost (e.g., minutes, hours, etc.) for existing work tasks. The user may accept or decline the meeting based on their understanding of this productivity change. Alternatively, they may select an option to reschedule. Upon, a selection to reschedule, the graphical user interface may be updated/modified to reflect a change to productivity based on a proposed time, as shown in greater detail in FIG. 6.

FIG. 6 illustrates another example graphical user interface for scheduling, as per some embodiments. The graphical user interface is directed to a specific improvement to the way computers operate because the graphical user interface imparts specific functionality directly related to the GUI's structure that resolves a prior art problem identified in the art. More specifically, the claims improve usability of the graphical user interface by updating in real time the graphical user interface to capture the changes in productivity based on rescheduling new meetings, thus improving the user experience.

As shown, graphical user interface (GUI) 600 illustrates schedule 602 with a two work-week (604 and 606) time span and a separate scheduling impact/options section 608. Within the first week, a first meeting (meeting 1) and a second meeting (meeting 2) have been previously scheduled. A new meeting request for Thursday October 15th 10:30-11:30 AM was previously received (FIG. 5) and a request to reschedule was received by the scheduling system. A determination for changes in productivity, based on a user accepting this proposed rescheduled meeting time, reflects at least a second implementation instance of the meeting optimization model. This instance takes into account the user's current schedule and current productivity. Alternatively, or in addition, the meeting optimization model may weight this request based on an inferred importance. For example, the meeting optimization model is trained to recognize and classify meeting importance.

In this non-limiting example, the rescheduled meeting request, if accepted, would improve the user's productivity 7%. While shown a percentage, the metric may be time lost (e.g., minutes, hours, etc.) for existing work tasks. The user may accept or decline the rescheduled meeting request based on their understanding of this productivity change. Alternatively, they may select an option to propose a reschedule meeting time of their choosing. Upon, the user providing a proposed reschedule meeting time, the graphical user interface may be updated/modified to reflect a change to productivity based on the new proposed time. This productivity change may reflect at least a third (or more) implementation instance of the meeting optimization model.

Therefore, the technology described herein solves one or more technical problems that exist in the realm of online computer systems. One problem, accepting too many meetings through a computerized scheduling system, may reduce overall productivity of a user. The technology as described herein provides an improvement in predicting real-time productivity changes based on prospective scheduling that increases a likelihood of a correlation with a real-time solution and subsequent successful outcome of changes to a schedule. Therefore, one or more solutions described herein are necessarily rooted in computer technology in order to overcome the problem specifically arising in the realm of computer networks. The technology described herein reduces or eliminates this problem of an inability for a computer to properly predict real-time productivity changes based on prospective scheduling as described in the various embodiments of FIGS. 1-6.

Figure 7:
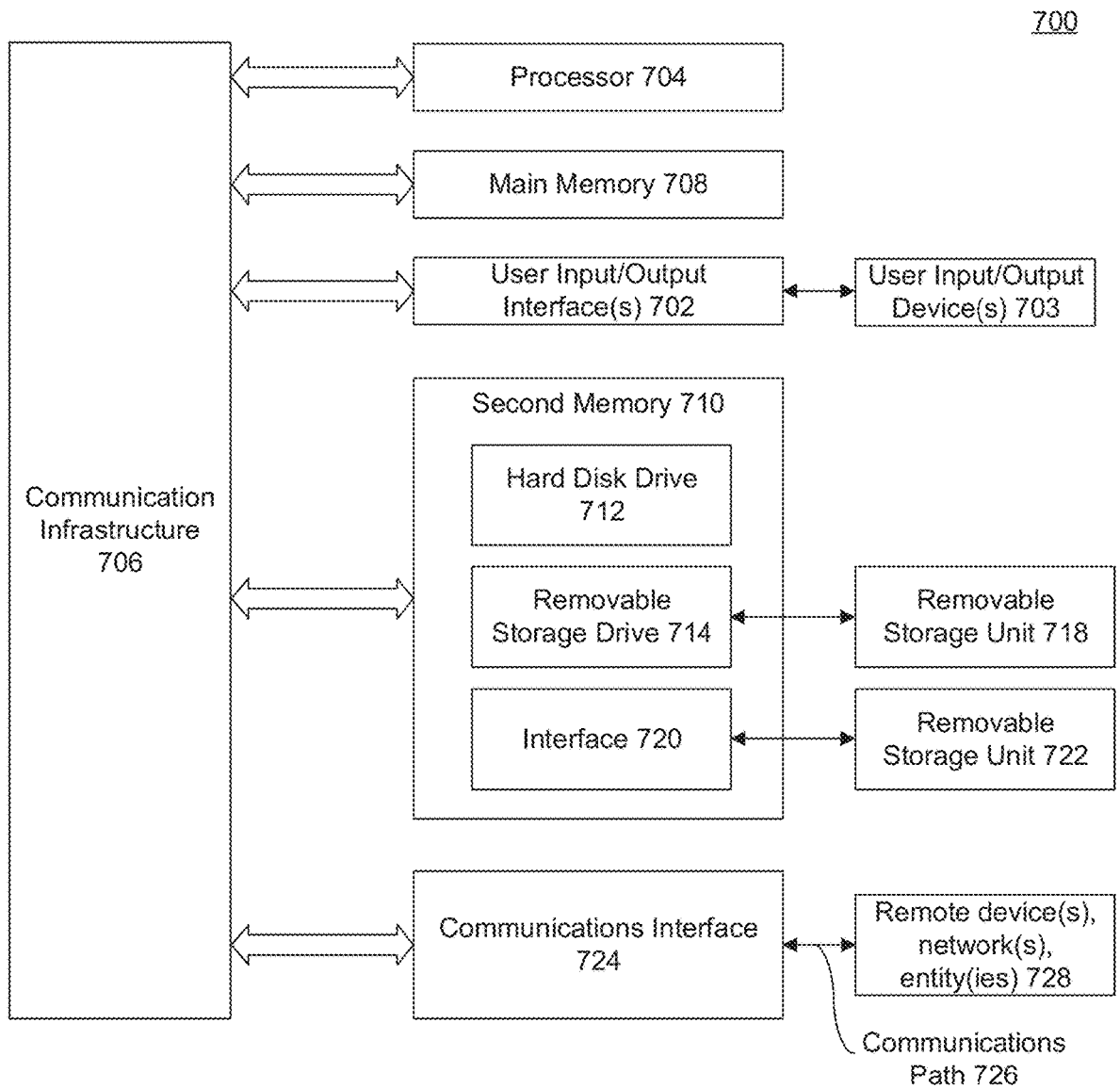
FIG. 7 is an example computer system useful for implementing various embodiments.

Various embodiments can be implemented, for example, using one or more computer systems, such as computer system 700 shown in FIG. 7. Computer system 700 can be used, for example, to implement methods 300 and 400 of FIGS. 3-4. For example, computer system 700 can identify productivity changes. Computer system 700 can be any computer capable of performing the functions described herein. Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics-processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired, and/or wireless, and which may include any combination of LANs, WANs, the Internet, etc. Control logic and/or data may be transmitted to and from computer system 700 via communication path 726.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system comprising:
   a machine learning system configured to:
   receive first training data as an input to the machine learning system, wherein the first training data includes multiple scheduling instances, and wherein the scheduling instances specify a plurality of scheduling parameters upon which to make a prediction of a future schedule;
   receive second training data as an input to the machine learning system, wherein the second training data includes multiple productivity measurement instances, and wherein the productivity measurement instances specify a plurality of productivity parameters upon which to make a prediction of a future productivity, wherein the plurality of productivity parameters are based on work product measurements;
   train, by the machine learning system, a productivity predictive model with the first training data and the second training data, wherein the productivity predictive model includes one or more algorithms to predict a current productivity change based on either accepting a new scheduling request or alternatively, rescheduling the new scheduling request;
   receive a current schedule and current productivity measurements of a user;
   receive a scheduling request for the user, wherein the scheduling request includes one or more proposed scheduling parameters;
   predict a future productivity change based on using the productivity predictive model with the current schedule, the current productivity measurements of the user, the one or more proposed scheduling parameters and accepting the scheduling request; and
   a graphical user interface configured to:
   display a graphic revealing the future productivity change of the user based on accepting the scheduling request.

2. The system of claim 1, further comprising:
   a natural language processor configured to:
   analyze text, numbers or speech of the first training data to ascertain the plurality of scheduling parameters from the scheduling instances; and
   analyze text, numbers or speech of the second training data to ascertain the plurality of productivity parameters from the productivity measurement instances.

3. The system of claim 1, wherein the plurality of scheduling parameters comprises any of: time of meeting, length of meeting, attendee travel components, importance of meeting, importance of meeting attendees, associated project, availability, conflicts, work hours, meetings outside of the work hours, time zone, or previous meeting cancelations.

4. The system of claim 1, wherein the first training data comprises calendar components.

5. The system of claim 1, wherein the second training data comprises project tracking components.

6. The system of claim 1, wherein the plurality of productivity parameters comprises any of: work completed by a worker per a selected time frame, a number of hours worked on an assigned project, an assigned work project status, a completion level of work product checklists, a summary of completed work or a number of calls successfully answered per selected time period.

7. The system of claim 1, wherein the machine learning system is further configured to:
   selectively weight the plurality of productivity parameters based on predetermined productivity standards of any of: a company, an industry, a technology, a geography, a project, a team or an individual.

8. The system of claim 1, wherein the future productivity change is based on any of: meetings attended, calls answered, cancellations, work product completed, project status, or time to be spent on a project associated with the scheduling request.

9. The system of claim 1, wherein the machine learning system is further configured to:
   generate a productivity score;
   generate a change to the productivity score; and
   wherein the graphic further reflects at least the change to the productivity score.

10. A computer implemented method for processing a scheduling request, comprising:

receiving first training data as an input to a machine learning system, wherein the first training data includes multiple scheduling instances, and wherein the scheduling instances specify a plurality of scheduling parameters upon which to make a prediction of a future schedule;

receiving second training data as an input to the machine learning system, wherein the second training data includes multiple productivity measurement instances, and wherein the productivity measurement instances specify a plurality of productivity parameters upon which to make a prediction of a future productivity, wherein the plurality of productivity parameters are based on work product measurements;

training, by the machine learning system, a productivity predictive model with the first training data and the second training data, wherein the productivity predictive model includes one or more algorithms to predict a current productivity change based on either accepting a new scheduling request or alternatively, rescheduling the new scheduling request;

receiving a current schedule and current productivity measurements of a user;

receiving a scheduling request for the user, wherein the scheduling request includes one or more proposed scheduling parameters;

predicting a future productivity change based on using the productivity predictive model with the current schedule, the current productivity measurements of the user, the one or more proposed scheduling parameters and accepting the scheduling request; and generating a graphic revealing the future productivity change of the user based on accepting the scheduling request.

11. The method of claim 10, further comprising:

analyzing text, numbers or speech of the first training data to ascertain the plurality of scheduling parameters from the scheduling instances; and analyzing text, numbers or speech of the second training data to ascertain the plurality of productivity parameters from the productivity measurement instances.

12. The method of claim 10, wherein the plurality of scheduling parameters comprises any of: time of meeting, length of meeting, attendee travel components, importance of meeting, importance of meeting attendees, associated project, availability, conflicts, work hours, meetings outside of the work hours, time zone, or previous meeting cancelations.

13. The method of claim 10, wherein the first training data comprises calendar components.

14. The method of claim 10, wherein the second training data comprises project tracking components.

15. The method of claim 10, wherein the plurality of productivity parameters comprises any of: work completed by a worker per a selected time frame, a number of hours worked on an assigned project, an assigned work project status, a completion level of work product checklists, a summary of completed work or a number of calls successfully answered per selected time period.

16. The method of claim 10, further comprising: selectively weighting the plurality of productivity parameters based on predetermined productivity standards of any of: a company, an industry, a technology, a geography, a project, a team or an individual.

17. The method of claim 10, wherein the future productivity change is based on any of: meetings attended, calls answered, cancellations, work product completion, project status, or time to be spent on a project associated with the scheduling request.

18. The method of claim 10, further comprising generating at least a productivity score and a change to the productivity score to be included in the graphic.

19. A non-transitory computer-readable medium having instructions stored thereon that, when executed by at least one computing device, cause the at least one computing device to perform operations comprising:

receiving first training data as an input to a machine learning system, wherein the first training data includes multiple scheduling instances, and wherein the scheduling instances specify a plurality of scheduling parameters upon which to make a prediction of a future schedule;

receiving second training data as an input to the machine learning system, wherein the second training data includes multiple productivity measurement instances, and wherein the productivity measurement instances specify a plurality of productivity parameters upon which to make a prediction of a future productivity, wherein the plurality of productivity parameters are based on work product measurements;

training, by the machine learning system, a productivity predictive model with the first training data and the second training data, wherein the productivity predictive model includes one or more algorithms to predict a current productivity change based on either accepting a new scheduling request or alternatively, rescheduling the new scheduling request;

receiving a current schedule and current productivity measurements of a user;

receiving a scheduling request for the user, wherein the scheduling request includes one or more proposed scheduling parameters;

predicting a future productivity change based on using the productivity predictive model with the current schedule, the current productivity measurements of the user, the one or more proposed scheduling parameters and accepting the scheduling request; and generating a graphic revealing the future productivity change of the user based on accepting the scheduling request.

20. The non-transitory computer-readable medium of claim 19, further configured to perform operations comprising:

selectively weighting the plurality of productivity parameters based on predetermined productivity standards of any of: a company, an industry, a technology, a geography, a selected project, a team or an individual.

* * * * *